Feb. 6, 1940.   F. RAMPACHER   2,189,615
ROLLER BEARING ARRANGEMENT
Filed Feb. 11, 1938
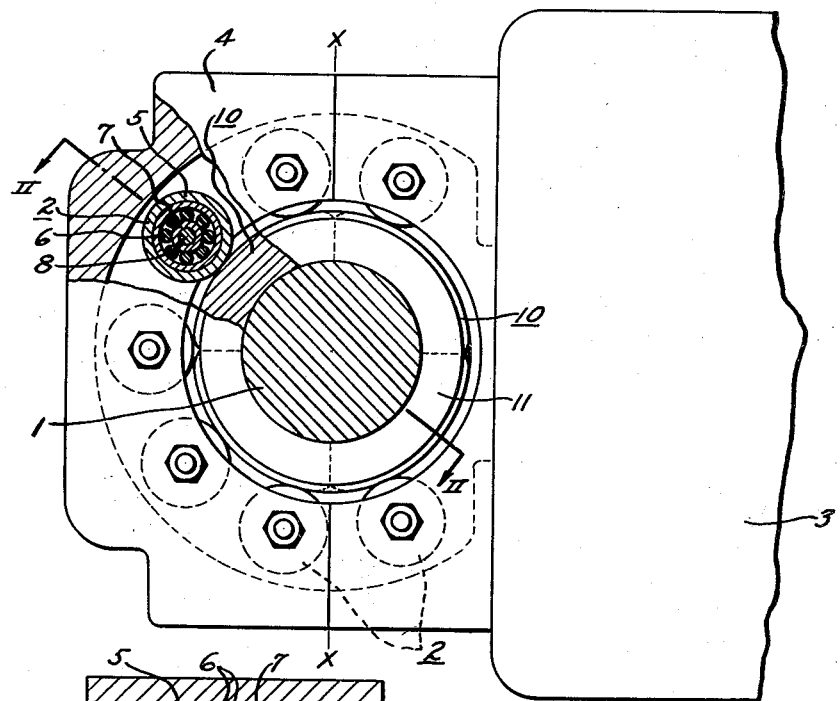
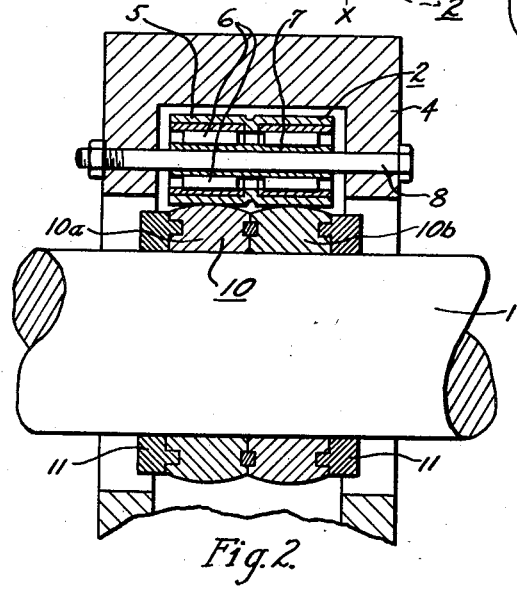
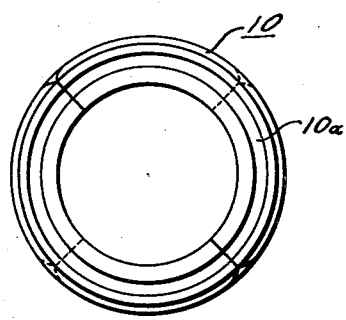
WITNESSES:
INVENTOR
Fritz Rampacher.
BY
ATTORNEY Patented Feb. 6, 1940

2,189,615

UNITED STATES PATENT OFFICE 2,189,615

ROLLER BEARING ARRANGEMENT

Fritz Rampacher, Berlin-Charlottenburg, Germany, assignor to Westinghouse Electric & Manufacturing Company, East Pittsburgh, Pa., a corporation of Pennsylvania Application February 11, 1938, Serial No. 189,993
In Germany June 9, 1937

4 Claims. (Cl. 308—203)

The invention relates to a roller bearing arrangement, particularly a roller bearing which serves for the nose-suspension of electric drive motors on the driven axles. The use of roller bearings encountered, heretofore in this case, great difficulties because it was not possible to design divided roller bearings which have a sufficiently high life.

Furthermore, space limitations and the necessity of maintaining a certain distance between gear centers frequently make the use of roller bearings of the type previously constructed, impractical.

An object of the invention is to provide a roller bearing which may be assembled readily on the axle of a railway vehicle.

Another object of the invention is to provide a roller bearing for supporting a motor on the axle of a railway vehicle in such a manner that the distance between the axle and the motor housing is materially reduced.

A further object of the invention is to provide a roller bearing of the divided type which will have a long life and which may be economically manufactured.

According to the invention, an advantageous construction of roller bearings which is particularly suitable for the nose-suspension of railway motors is attained by dividing the ball races, which by axial cuts are subdivided into two segments also in an axial direction, and so combining them that the upright joints of the individual parts are displaced with reference to each other. This construction of the ball races makes possible the prevention of excessive stresses on the upright joints which endanger the life of the roller bearings when using sufficiently wide roller bodies or using double roller bodies. In a particularly advantageous manner, the construction of the roller bearings on the upright joints of the ball races may be such that on the upright joints themselves, the rollers do not, in general, come into contact with the ball races. In this manner a disturbance of the edges on the upright joints and together with this, a disturbance of the bearings is with certainty excluded.

In the following, the invention will be explained more in detail with reference to an exemplary embodiment which is illustrated in the accompanying drawing, in which:

Figure 1 is a view, partially in section and partially in elevation, of a bearing constructed in accordance with the invention;

Fig. 2 is a view, in section, taken along the line II—II of Fig. 1, and

Fig. 3 is a view, in elevation, of a portion of the bearing structure.

In Figure 1 the numeral 1 signifies the axle. The axle is supported on a number of rollers 2 which are supported in bearings in a bearing housing 4 joined to the motor housing 3. The rollers 2 consist of a rotating ring portion 5 which is supported in bearings by means of the usual roller bearings 6. The inner roller bearing ball races 7 are located on the holding bolts 8 which are supported in the bearing housing 4. The bearing housing is divided in a plane $x$—$x$.

The support of the axle 1 on the above-mentioned roller bodies 2 takes place by means of the axial ball race 10 mounted on the running axle. This ball race 10 consists of two ring portions 10a and 10b (see Fig. 2) disposed adjacent to each other in an axial direction. These ring portions are again divided into two parts by a diametral cut. Separate holding rings 11 serve to hold the parts 10a and 10b together and to fasten them on to the axle. During the mounting of the ring portions on the axle, these are so displaced with reference to each other that the upright joints of the ring portions are not disposed adjacent to each other but are also displaced with reference to each other. On the upright joints, the ring portions 10a and 10b are preferably beveled or rounded off (see Fig. 3). The rollers 2 are so designed that the outer running wreath 5 has two running surfaces which lie on the ball race parts 10a and 10b which are under certain circumstances machined in the form of balls. To support the outer ball races 5 on the bolts 8, two ordinary roller bearings disposed adjacent to each other are provided.

The arrangement according to the invention has the advantage that adjacent to a running surface broken up by an upright joint, a second running surface which is not broken up is present. Therefore, the stressing of the upright edges are for each case considerably decreased. The stressing may be completely avoided if the upright edges are rounded or bevelled, because in this case the rollers are only supported on a passing running surface.

According to the further design of the invention, a comparatively small distance between the bearing axle and the motor housing is attained by arranging that, within a certain angular region between the vehicle axle and the motor housing, no roller bearings are present, as shown in Fig. 1. In this manner, the distance between the shaft of the motor (not shown) and the axle may be materially reduced, thereby permitting the selection of the proper gear sizes to secure the desired speed and operating characteristics of the motor. Or, in other words, a roller bearing of the type herein disclosed may be utilized in place of a sleeve bearing without increasing the distance between gear centers, which is not the case with roller bearings of previously known types.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. A roller bearing for supporting a motor on an axle comprising a ball race disposed on the axle and a plurality of rollers cooperating with the race, said race being divided axially into a plurality of rings, and each ring being cut into two segments, said rings being so disposed on the axle that the joints between segments are displaced with reference to each other, and ring means having flanges disposed in the ring segments for retaining said ring segments on the axle.

2. A roller bearing for supporting a motor on an axle comprising a ball race disposed on the axle and a plurality of rollers cooperating with the race, said race being divided axially into a plurality of rings, and each ring being cut into two segments, said rings being so disposed on the axle that the joints between segments are displaced with reference to each other, the edges of the joints between segments being beveled or rounded, and ring means having flanges disposed in the ring segments for retaining said ring segments on the axle.

3. A roller bearing for supporting a motor on an axle comprising a ball race disposed on the axle, a plurality of rollers cooperating with the race, a housing for the bearing, bearing bolts for supporting said rollers, said bolts being fixed in the housing, and roller bearings for supporting said rollers on said bearing bolts, said bearing housing being divided into two sections, each section containing part of said bearing bolts, said race being divided axially into a plurality of rings, each ring being cut into a plurality of segments, and ring means having flanges disposed in the ring segments for retaining said ring segments on the axle.

4. A roller bearing for supporting a motor on an axle comprising a ball race disposed on the axle, a plurality of rollers cooperating with the race, a housing for the bearing, bearing bolts for supporting said rollers, said bolts being fixed in the housing, and roller bearings for supporting said rollers on said bearing bolts, said rollers being omitted from a predetermined angular distance between the motor housing and the axle to decrease the distance between the axle and the motor housing, said housing being divided into a plurality of sections, each section containing part of said bearing bolts, said race being divided axially into a plurality of rings, each ring being cut into a plurality of segments, and ring means having flanges disposed in the ring segments for retaining said ring segments on the axle.

FRITZ RAMPACHER.